(12) United States Patent
Allert et al.

(10) Patent No.: US 11,231,854 B2
(45) Date of Patent: Jan. 25, 2022

(54) METHODS AND APPARATUS FOR ESTIMATING THE WEAR OF A NON-VOLATILE MEMORY

(71) Applicant: HYPERSTONE GMBH, Constance (DE)

(72) Inventors: Steffen Allert, Constance (DE); Martin Roeder, Constance (DE); Christoph Baumhof, Radolfzell (DE)

(73) Assignee: HYPERSTONE GMBH, Constance (DE)

( * ) Notice: Subject to any disclaimer, the term of this patent is extended or adjusted under 35 U.S.C. 154(b) by 54 days.

(21) Appl. No.: 16/722,178

(22) Filed: Dec. 20, 2019

(65) Prior Publication Data

US 2020/0249851 A1    Aug. 6, 2020

(30) Foreign Application Priority Data

Feb. 5, 2019   (DE) .......................... 102019102861.2

(51) Int. Cl.
*G06F 3/06* (2006.01)

(52) U.S. Cl.
CPC .......... *G06F 3/0616* (2013.01); *G06F 3/0653* (2013.01); *G06F 3/0659* (2013.01); *G06F 3/0679* (2013.01)

(58) Field of Classification Search
CPC .... G06F 3/0616; G06F 3/0653; G06F 3/0659; G06F 3/0679
See application file for complete search history.

(56) References Cited

U.S. PATENT DOCUMENTS

| | | | |
|---|---|---|---|
| 8,463,983 B2 | 6/2013 | Eleftherlou et al. | |
| 10,318,180 B1* | 6/2019 | Benhanokh | G06F 12/0246 |
| 2010/0262766 A1* | 10/2010 | Sprinkle | G06F 12/0813 711/103 |
| 2012/0311246 A1 | 12/2012 | McWilliams et al. | |
| 2014/0181595 A1* | 6/2014 | Hoang | G06F 11/3034 714/47.3 |
| 2015/0100721 A1 | 4/2015 | Koseki | |
| 2016/0062660 A1 | 3/2016 | Kunimatsu et al. | |
| 2017/0220268 A1* | 8/2017 | Guha | G06F 3/0688 |
| 2018/0307439 A1* | 10/2018 | Enz | G06F 9/50 |

* cited by examiner

*Primary Examiner* — Larry T Mackall
(74) *Attorney, Agent, or Firm* — HDC Intellectual Property Law, LLP

(57) ABSTRACT

Some embodiments relate to a method and a corresponding apparatus for estimating the wear of a non-volatile memory. Such a method may include determining a load profile with respect to a real access load occurring during a defined test period where the load profile indicates a respectively associated access load for accesses to a first NVM, and generating access data representing the determined load profile. The method further includes determining an estimated value for the wear of a particular second NVM in part on the basis of the access data.

20 Claims, 3 Drawing Sheets

METHODS AND APPARATUS FOR ESTIMATING THE WEAR OF A NON-VOLATILE MEMORY

FIELD OF THE INVENTION

Some embodiments discussed herein relate to a methods and apparatus for estimating the wear of a non-volatile memory (NVM), in particular a flash memory, as well as computer programs configured to execute the methods.

BACKGROUND

Non-volatile digital memories, in particular flash memories, can nowadays be found in a large number of electronic devices, for example in communication technology and automotive technology. Such non-volatile memories (NVMs) are characterized by the fact that, unlike volatile memories such as, for example, random access memories (RAMs), they do not lose the data stored in them when their power supply is lost. However, NVMs usually also have some particular features that need to be taken into account as regards their control.

These include in particular the fact that with some types of NVMs, in particular with flash memories, the individual memory cells cannot be individually erased or reprogrammed, but that this is only possible on a block by block basis for respective predefined physical blocks of memory cells (physical memory blocks). In order to reprogram one or more memory cells belonging to the same physical memory block in a flash memory, for example, the entire physical memory block first needs to be erased and then rewritten with a desired new data pattern which, in addition to the unchanged data of the other cells, also contains the changed data of the memory cells to be reprogrammed.

Further, for some types of NVMs, in particular flash memories, the number of erase operations and thus also write operations per physical memory block that can be performed on such an NVM during the course of its lifetime (maximum number of cycles, or endurance) is limited due to its physical structure. With such an NVM, a corresponding wear occurs during the course of its operation until finally, after a certain degree of wear, the reliability of the memory decreases significantly and thus when the maximum number of cycles is reached, the end of life (EOL) specified by this is reached. Different NVMs can have different values for the maximum number of cycles depending on their design, so that, in dependence upon the respective application, the NVM that typically represents an optimum choice for the specification of a system with such an NVM, in particular a flash memory, is the one that on the one hand fulfills the maximum number of cycles required for the application, but on the other hand is not oversized in this respect, since this would usually be associated with unnecessary additional costs (typically, NVMs with a higher maximum number of cycles are also more complex to manufacture and therefore more expensive).

There exists a need in the art for enhanced methods and apparatus for estimating the wear of a non-volatile memory.

SUMMARY

Some embodiments discussed herein relate to a methods and apparatus for estimating the wear of a non-volatile memory (NVM), in particular a flash memory, as well as computer programs configured to execute the methods.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION

Figure 1:
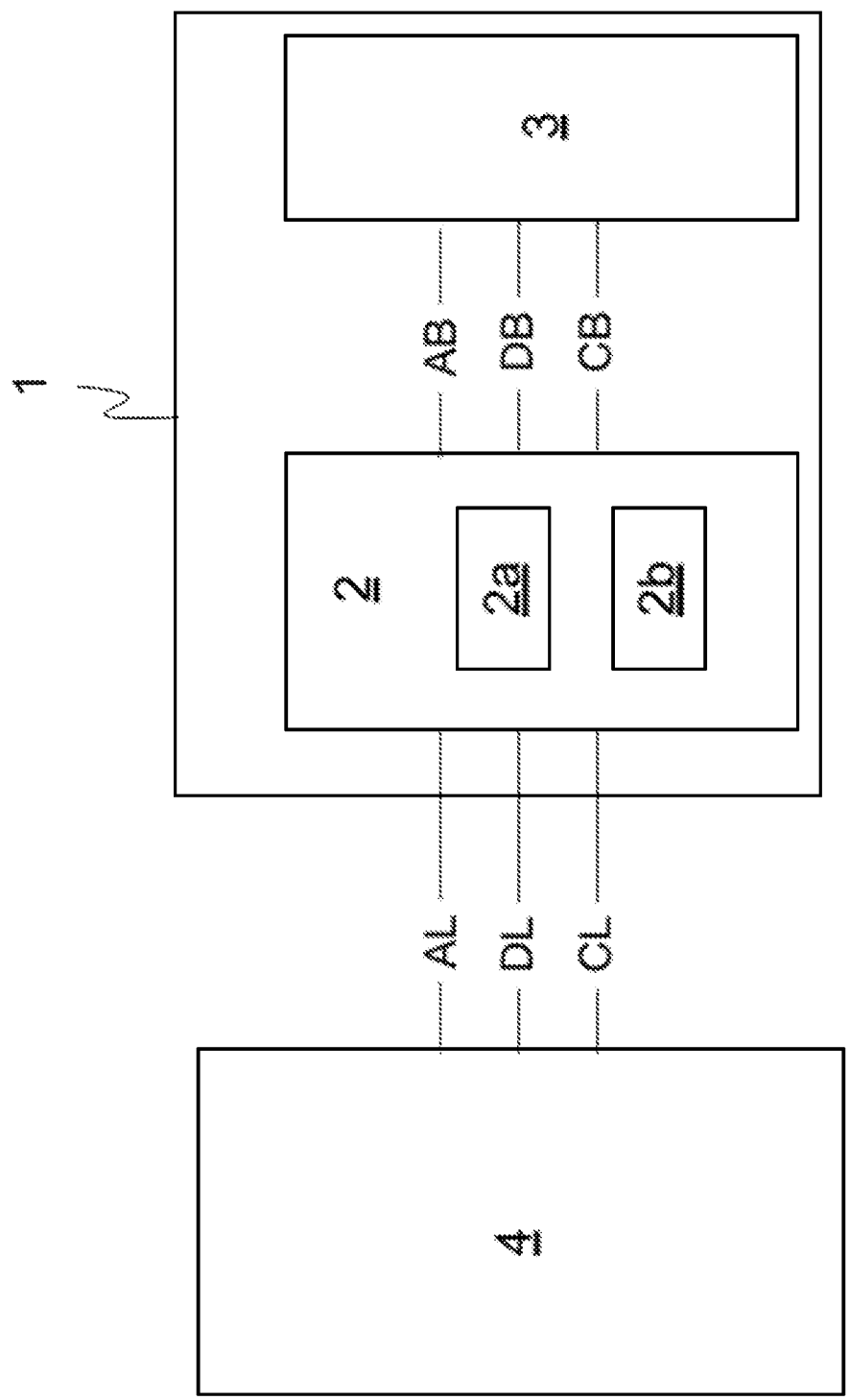
FIG. 1 schematically shows a block diagram which schematically illustrates a memory system including a NVM and a memory controller in accordance with an embodiment of the present invention.

Some embodiments discussed herein relate to a methods and apparatus for estimating the wear of a non-volatile memory (NVM), in particular a flash memory, as well as computer programs configured to execute the methods.

Some embodiments provide methods for estimating a wear of a non-volatile memory (NVM). The methods include: determining a load profile with respect to a real access load occurring during a defined test period, where the load profile indicates, for a plurality of different access types, a respectively associated access load for accesses to a first NVM, and generating access data representing the determined load profile; and determining an estimated value for the wear of a particular second NVM on the basis of the access data and of a set of parameters which characterizes a wear-relevant physical or functional property of the second NVM or of a memory controller associated therewith for controlling the second NVM; where the determining the estimated value for the wear comprises: determining a gross amount of data caused by the accesses to the first NVM during the test period, which is indicative of a thereby occurring total number of accesses which is determined as a function of the determined load profile and the set of parameters.

In some instances of the aforementioned embodiments, the first NVM is identical to the second NVM. In various instances of the aforementioned embodiments, at least the determination of the load profile is carried out by means of at least one computer program stored on the first NVM itself, or on a memory controller associated with the first NVM for the purpose of its control, which computer program is executed in the background during the execution of one or more host applications using the first NVM, in order to detect the accesses of the one or more host applications to the first NVM during their execution. In some instances of the aforementioned embodiments, the determination of the respective access load for accesses to the first NVM is expressed as the number of corresponding accesses in relation to a respective integer multiple of the smallest data unit transferable via a host-side interface of a memory system comprising the first NVM. In one or more instances of the aforementioned embodiments, determining the load profile comprises determining an associated access load for accesses to the first NVM relating to at least two of the following access types: write load in sequential access (WS), write load in random access (WR), read load in sequential access (RS), and/or read load in random access (RR). In various instances of the aforementioned embodiments, the methods further include outputting the load profile which has been determined for one or more of the access types covered.

In some instances of the aforementioned embodiments, the load profile is determined in such a way that it indicates, for each type of access taken into account, for different value ranges for the respective access size, an associated access load. In some cases, the second NVM is subject to a block-based management by a memory controller assigned to the second NVM; and determining an estimated value for the wear comprises determining, for each of the access loads indicated in the load profile as a function of the access size, an associated write amplification factor, and determining the gross amount of data on the basis of these write amplification factors. In various cases, a smaller write amplification factor is assigned to read operations than to write operations. In one or more cases, a write amplification factor is assigned to distributed write operations, which write amplification factor depends on the ratio of the physical memory block size of the second NVM to the respective access size. In some cases, the method further includes determining the gross amount of data by adding the respective products of the absolute number of accesses to the first NVM detected during the test period or the relative number of accesses to the first NVM for the associated type of access in relation to the total number of accesses detected during the test period, the respective associated access size, and the respective associated write amplification factor.

In various instances of the aforementioned embodiments, the method further includes determining, per access type, an associated net amount of data by adding the products of the absolute number or, related to the total number of accesses of the associated access type, the relative number, of respective accesses on the one hand and the respective associated access size on the other hand. In some instances of the aforementioned embodiments, the set of parameters characterizes at least one of the following physical or functional properties of the second NVM or of a memory controller assigned to the second NVM for its control, or of a combination of two or more of these properties: the type of the second NVM, the memory size of the second NVM, the page size of the memory pages of the second NVM, the physical memory block size of the second NVM, and/or the specified maximum number of allowable write/erase cycles of the second NVM. The configuration of the memory controller assigned to the second NVM for its control with respect to at least one of the following: over-provisioning, early acknowledge, and static data.

In some instances of the aforementioned embodiments, the methods further include estimating the lifetime of the second NVM by forming a relation between the time duration of the test period and the specific estimated value for the wear of the second NVM. In various instances, the determination of an estimated value for the wear on the basis of the access data is carried out in relation to a plurality of different sets of parameters that differ from each other with respect to at least one parameter value; and the method further includes at least one of the following steps: outputting the respective estimates determined for the various sets of parameters; automatically selecting one of the sets of parameters from the plurality of sets of parameters on the basis of the determined estimates and in accordance with a predetermined selection criterion related to the estimated value with respect to which the selected set of parameters represents a relative optimum, and at least outputting a portion of that set of parameters or an identification thereof.

In various instances of the aforementioned embodiments, the methods further include transmitting configuration data to a host computer representing a request to the host computer to use, for future accesses to the second NVM, an access configuration which is defined by the configuration data and which is selected in dependence on the selected set of parameters.

Other embodiments provide computer readable media having instructions executable by a memory control system to perform one or more of the above described instances of the aforementioned methods. Yet other embodiments provide apparatus operable to perform one or more of the above described instances of the aforementioned methods.

It has been found that actual wear of an NVM is usually dependent on the application, as different applications typically involve different access patterns for reading, writing and erasing. As already mentioned, for some types of NVMs, especially flash memories, the write access and the erase access are correlated to the extent that a write access requires a preceding erase access for the physical memory block into which new data is to be written. Some embodiments discussed herein efficiently determine an application-related estimation of the wear of a non-volatile memory for different types or configurations of such memories.

Various embodiments relate to methods, in particular a computer-implemented methods, for estimating a wear of a non-volatile memory (NVM), in particular a flash memory. The method comprises: (i) determining a load profile with respect to a real access load occurring during a defined test period, wherein the load profile indicates, for a plurality of different access types, a respectively associated access load for accesses to a first NVM, and generating access data representing the determined load profile; (ii) determining an estimated value for the wear of a particular second NVM on the basis of the access data and of a set of parameters which characterizes a wear-relevant physical or functional property of the second NVM or of a memory controller associated therewith for controlling the second NVM. Determining the estimated value for the wear comprises: determining a gross amount of data caused by the accesses to the first NVM during the test period, which is indicative of a thereby occurring total number of accesses which is determined as a function of the determined load profile and the set of parameters.

The term "access load" is used herein in its broadest sense to refer to a workload of the NVM due to read, write or erase accesses (each a "type of access" in the sense of the invention), in particular by a host computer.

The term "set of parameters" is used herein in its broadest sense to be understood to refer to a defined number of parameters comprising at least one parameter.

On the one hand, the methods mentioned above can advantageously be used to determine a current wear of the first NVM used to determine the load profile. This can in particular be used to estimate, based thereon, the expected remaining lifetime of the first NVM on the basis of the load profile. On the other hand, however, the method can advantageously also be used to estimate the expected wear respectively for a plurality of available constructional designs for the second NVM according to the application case occurring during the determination of the load profile for the first NVM. This in turn can be used to select, based thereon, an optimized constructional design for the second NVM by means of a wear-related selection criterion and to design a memory system for this application case. Thus, on the basis of a test performed by means of a single first NVM during the test period, the necessary collection of data can be generated to enable an optimized selection of a second NVM, subsequently used in normal operation, from a multitude of different NVM types or configurations. In this way, in particular the effort in terms of material and time for carrying out additional tests for NVM types or configurations different from the first NVM for the purpose of making an optimal selection can be dispensed with.

In the following, preferred embodiments of the methods will be described, each of which can be combined at will with each other as well as with the other aspects of the invention described unless this is expressly excluded or technically impossible.

According to some embodiments, the first NVM may be identical to the second NVM. This is advantageous in particular if this NVM has different modes of operation, which can be selected in particular by corresponding, different configurations, i.e. sets of parameters or software or firmware variants for the software or firmware used in order to control it. Hence the method according to this embodiment can be used in particular in order to obtain a wear-related collection of data for one and the same physical NVM, on the basis of which an optimized configuration of the NVM for the application case used during the test period can be carried out by selecting a corresponding set of parameters or a corresponding software or firmware variant.

According to some embodiments, at least the determination of the load profile is carried out by means of at least one computer program stored on the first NVM itself, or on a memory controller associated with the first NVM for the purpose of its control, in particular implemented as firmware, which is executed in the background, in particular by the memory controller, during the execution of one or more host applications using the first NVM, in order to detect the accesses of the one or more host applications to the first NVM during their execution. In this way, a particularly efficient implementation can be achieved, since the determination of the load profile is already carried out during the test period and not only afterwards, and in particular in the case of an execution of the method by the control device for the first NVM, the accesses to the NVM occurring during the test period pass through the control device and have to be processed there anyway. In addition, such control devices or, in addition to the control device, memory systems containing the NVM, are then already capable of performing the method in accordance with the invention without there being a need to implement the method by a solution which is external to the memory controller or the memory system. This in turn enables in particular an operator of such a memory system to carry out the method themselves for one or more different use cases without the need for special further equipment or the assistance of a manufacturer of the memory controller or the memory system.

According to some embodiments, the determination of the respective access load for accesses to the first NVM is expressed as the number of corresponding accesses in relation to a respective integer multiple of the smallest data unit transferable via a host-side interface of a memory system comprising the first NVM. In common host interfaces, this smallest unit is often referred to as a "logical block" or "sector". It is usually 512 bytes in size, however without this being intended to be regarded as a limiting factor.

According to some embodiments, determining the load profile comprises determining an associated access load for accesses to the first NVM relating to at least two of the following access types: (i) write load in sequential access; (ii) write load in random access; (iii) read load in sequential access; (iv) read load in random access. Such a differentiation is advantageous in particular because each of these different access types causes different levels of wear of the NVM. Typically, the wear is higher in writing than in reading and higher in random access than in a corresponding sequential access.

The term "random access" (or equivalent: "distributed access") means here, as usual, that data to be written or to be read, in contrast to sequential access, in which it is sequentially written to, or read from, successive logical memory areas, is written to, or read from, a plurality of distributed, non-consecutive such memory areas. Usually, this also results in an increased number of erase operations, especially in the case of a write operation, and thus in additional wear. Reading can also cause wear, since the frequency of reading in many types of NVMs, in particular flash memories, also has an impact on the frequency of occurrence of refresh cycles, as they are referred to, in which data that is already stored is regularly rewritten (programmed) by the memory system itself for the purpose of ensuring data integrity, in order to proactively counter later reading errors and thus to avoid them.

According to some embodiments, the method further comprises individually outputting the load profile which has been determined for one or more of the access types covered. The outputting can then take place in particular in the form of an output of corresponding data or by means of an output at a man-machine interface. Such a separate output regarding the different access types is helpful in particular in order to get a complete overview of the access pattern that has occurred during the test period. Above all, this also makes it possible, as will be described in detail below, to optimize the overall performance (in particular the lifetime) of the overall system made up of the host computer and the NVM used by it, including its memory control, on the basis of this information, for example by adapting the way in which the host accesses the NVM.

According to some embodiments, the load profile is determined in such a way that it indicates, for each type of access taken into account, for different value ranges for the respective access size, an associated access load. In this context, the term "access size" refers to a measure of the amount of data to be written or read for a particular access, which can be expressed in particular in multiples of the number of sectors used for writing or reading. For each type of access, this results in a data representation subdivided for different access sizes, for example in table form, from which the frequency of corresponding accesses with regard to different value ranges for the respective associated access size can be obtained. On the one hand, this subdivision into different value ranges provides a simple way of implementation, which on the other hand nevertheless allows a sufficient degree of differentiation between different access sizes and access types and thus a more exact estimation of the wear of the NVM concerned. Such a subdivision along the access size dimension into M+1 different value ranges can be done in a non-linear way. An advantageous variant consists in particular in expressing the respective i-th access size Zi of the subdivision as a power of two, for example in such a way that $Zi=2^i$, where satisfies ($0 \leq i \leq M$).

According to some embodiments, the second NVM is subject to a block-based management by a memory controller assigned to it. In addition, determining an estimated value for the wear comprises determining, for each of the access loads indicated in the load profile as a function of the access size, an associated write amplification factor, and determining the gross amount of data on the basis of these write amplification factors. By means of such write amplification factors it is possible, in particular, to take into account the individual degree of wear, which is typically different for the different access types, when it comes to determining the estimated value, in order to further increase the accuracy of the estimated value. In particular, in this way, respective individual and different write amplification factors, which can optionally also differ in dependence upon the access size, can be assigned to the different write and read access types described above. With regard to read accesses, the corresponding write amplification factors relate to the refresh write accesses that are required, increasingly so in particular in connection with frequent read accesses. The term "block-based" refers to the granularity of the mapping of logical to physical memory units, which is done in units of physical memory blocks.

According to some of these embodiments, a smaller write amplification factor is assigned to read operations than to write operations. In addition, or as an alternative, a write amplification factor is assigned to distributed write operations, which write amplification factor depends on the ratio of the physical memory block size of the second NVM to the respective access size. Such a choice of different write amplification factors is used to map the actual different physical degrees of wear (e.g. damage to the gate dielectric in flash cells) of many types of NVMs, in particular flash memories, for the different access types mentioned, and to make them available for the further determination of the estimated value of wear of the NVM.

According to some embodiments, the method further comprises: determining the gross amount of data by adding the respective products of (i) the absolute number of accesses to the first NVM detected during the test period or the relative number of accesses to the first NVM for the associated type of access in relation to the total number of accesses detected during the test period, (ii) the respective associated access size, and (iii) the respective associated write amplification factor.

According to some embodiments, the methods further comprise: determining, per access type, an associated net amount of data by adding the products of the absolute number or, related to the total number of accesses of the associated access type, the relative number, of respective accesses on the one hand and the respective associated access size on the other hand.

These two methods mentioned above represent particularly simple possibilities of determining the gross amounts of data or net amounts of data read and written during the test period, which can be carried out fast, even with limited computing resources, in particular in real time.

According to some embodiments, the set of parameters characterizes at least one of the following physical or functional properties of the second NVM or of a memory controller assigned to the second NVM for its control, or of a combination of two or more of these properties: (i) the type of the second NVM; (ii) the memory size of the second NVM; (iii) the page size of the memory pages of the second NVM; (iv) the physical memory block size of the second NVM; (v) the specified maximum number of allowable write/erase cycles of the second NVM; (vi) the configuration of the memory controller assigned to the second NVM for its control with respect to at least one of the following: over-provisioning, early acknowledge and static data. Common to these parameters is that they each have an impact on the wear of the second NVM and the physical or functional property of the second NVM and thus its construction or design (or that of its control device), which may in particular also be relevant in terms of cost.

According to some embodiments, the method further comprises: estimating the lifetime of the second NVM by forming a relation between the time duration T of the test period and the specific estimated value A for the wear of the second NVM, in particular a ratio. In particular, according to one variant, the lifetime L can be estimated as follows: $L=T*(D/A)=T*(C*E/A)$. As shown here, the amount of data D that can be written to a NVM over its specified lifetime can be given in particular by the product of the memory capacity C of the NVM and the specified maximum number E of write/erase cycles. The estimated value for the lifetime L can then directly be compared with the application requirements in order to determine whether the second NVM for which the estimated value A has been determined meets the requirements and is therefore suitable or not, or whether it even over-satisfies them and thus represents a potentially oversized and therefore typically unnecessarily expensive solution, over which other solutions are to be preferred.

The "forming a relation" between two values can be done in particular by forming a ratio or comparison between the values. A classification of the values into a data table or similar defining certain value intervals is also conceivable. Ultimately, what is important is that one value is expressed in dependence on the other value or is defined in relation to it.

According to some embodiments, the determination of an estimated value for the wear on the basis of the access data is carried out in relation to a plurality of different sets of parameters that differ from each other with respect to at least one parameter value. In addition, the method further comprises at least one of the following steps: (i) outputting the respective estimates determined for the various sets of parameters; (ii) automatically selecting one of the sets of parameters from the plurality of sets of parameters on the basis of the determined estimates and in accordance with a predetermined selection criterion related to the estimated value with respect to which the selected set of parameters represents a relative optimum, and at least outputting a portion of that set of parameters or an identification thereof. In these embodiments, the selection of a suitable set of parameters and thus of a type of NVM or NVM configuration for the subsequent operation is itself part of the method in accordance with the invention.

The outputting of the various estimated values which have been determined for the various sets of parameters, which can take place in particular by means of corresponding data or via a man-machine interface, can be used in particular to provide this information for a manual selection of a specific set of parameters and thus a specific type of NVM or NVM configuration. According to the second variant (ii), this selection itself is also carried out automatically as part of the method, so that the method already provides the optimal set of parameters, at least in part, or at least information serving for its identification. On the basis of the most recently mentioned identification, the actual set of parameters itself can then be taken from a predetermined list, for example.

According to some embodiments building on this, the method further comprises: transmitting configuration data to a host computer representing a request to the host computer to use, for future accesses to the second NVM, an access configuration which is defined by the configuration data and which is selected in dependence on the selected set of parameters. These embodiments are advantageously applicable in particular if the first and second NVMs are identical and, accordingly, only one particular access configuration for the host or the configuration for this NVM or its memory control is to be selected by the method.

In addition, the method can however also be used if first the determination of the selected set of parameters from a set of different sets of parameters takes place as described, and then an NVM corresponding to the selected set of parameters is made available to the host computer as an information store. The configuration of the host computer according to these embodiments then serves to optimize the interaction between the host computer and the NVM and thus also to minimize the wear of the NVM or to increase its actual lifetime, in particular to optimize it.

A second aspect of the invention relates to a computer program which contains instructions which, when executed on one or more processors, cause the processor or processors to carry out the method according to the first aspect of the invention, in particular according to one or more of the embodiments described herein.

The computer program may in particular be stored on a non-volatile medium. This is preferably a data carrier in the form of an optical data carrier or a flash memory module. This may be advantageous if the computer program as such is to be marketed independently of a processor platform on which the one or more programs are to be executed. In a further implementation, the computer program may be present as a file on a data processing unit, in particular on a server, and may be downloadable via a data connection, for example the Internet or a dedicated data connection, such as a proprietary or a local network. In addition, the computer program may comprise a plurality of interacting individual program modules.

A third aspect of the invention relates to a device for estimating a wear of a NVM, in particular a flash memory, wherein the device is configured to carry out the method according to the first aspect of the invention, in particular according to one or more of the embodiments thereof described herein. For this purpose, the device may in particular be configured, by means of a computer program according to the second aspect of the invention, to carry out the method. For this purpose, the computer program may be stored, for example, on the device itself or in a memory assigned to it and to which the device has access. The device may in particular be a memory system which comprises the first NVM in accordance with the method, as well as a memory controller controlling it.

According to some embodiments of the device, this comprises a memory control device assigned to the NVM for the purpose of controlling it (memory controller, in particular flash controller in the case of a flash NVM). It may in particular be constructed as such a memory control device (memory controller).

The example memory system 1 illustrated in FIG. 1 and based on a NVM comprises a memory controller 2 (memory control) for controlling the memory system, and a NVM 3 controlled by this, in particular a NVM 3 managed by this, which can in particular be a flash memory device, for example of the NAND type. The memory system 1 is connected to a host 4, such as a computer to which the memory system 1 is assigned, via a set of address lines AL, a set of data lines DL and a set of control lines CL. The memory controller 2 comprises a processor unit 2a and an internal memory 2b, typically of the embedded type, and is connected to the memory 3 via an address bus AB, a data bus DB and a control bus CB. In a corresponding manner, the host 4 has an indirect read and/or write access to the memory 3 via its connections AL, DL and CL to the memory controller 2, which in turn can access memory 3 directly via buses AB, DB and CB. Each of the sets of lines or buses AL, DL, CL, AB, DB and CD can be implemented by means of one or more individual communication line or lines. The lines AL and CL, as well as the bus AB may also be omitted.

A computer program, preferably in the form of firmware, is stored in the internal memory 2b of the memory controller 2. It is configured to carry out the method in accordance with the invention when it is executed on the processor platform 2a of the memory controller 2, in particular according to the embodiment of the same described below with reference to FIG. 3. In any case, with regard to the determination of the load profile, this is carried out with regard to the NVM 3.

Figure 2:
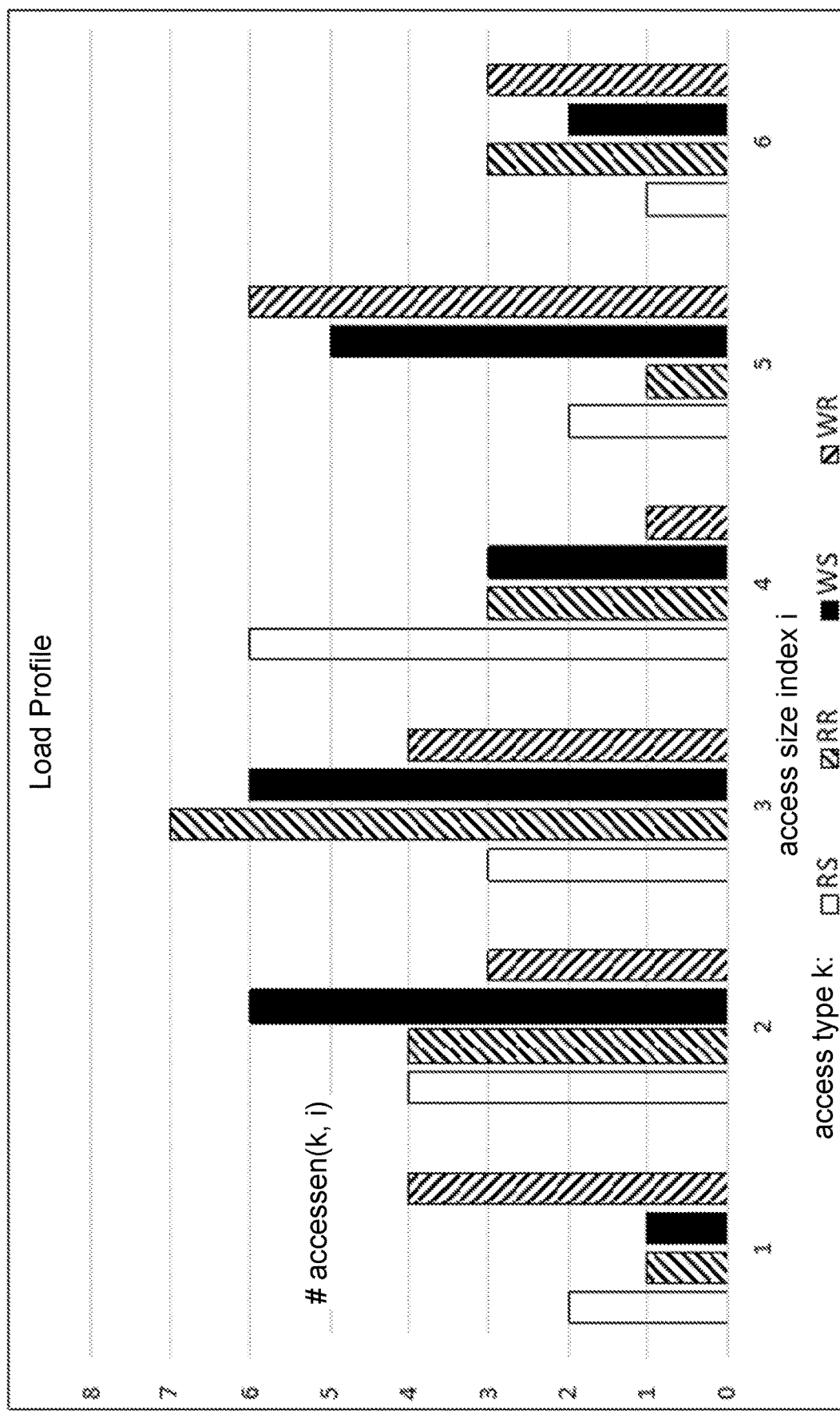
FIG. 2 shows an example load profile, in accordance with a preferred form of the invention.

FIG. 2 illustrates, in the form of a bar chart, an example load profile $n(k,i)$ in accordance with the present invention, for four different access types k: Sequential Reading RS, Random Reading RR, Sequential Writing WS and Random Writing WR. For each of the access types k, the load profile indicates the number $n(k,i)$ of host accesses to the NVM 3 detected in a test period T (cf. FIG. 3) as a function of an access size $Z(i)$ identified by an associated index $i=0, \ldots, i_{max}$. The access sizes are each defined as an integer multiple s of a (logic) memory sector and indicate how many memory sectors are affected by the respective access. The size of such a memory sector can in particular be 512 bytes, which corresponds to a typical sector size for flash memories. The access sizes $Z(i)$ can in particular also be defined in a non-linear manner as a function of the index i. The following applies according to a possible variant: $Z(0)=1$, and $Z(i)=s$ with $2i-1 < s \leq 2i$ for $i \geq 1$.

Figure 3:
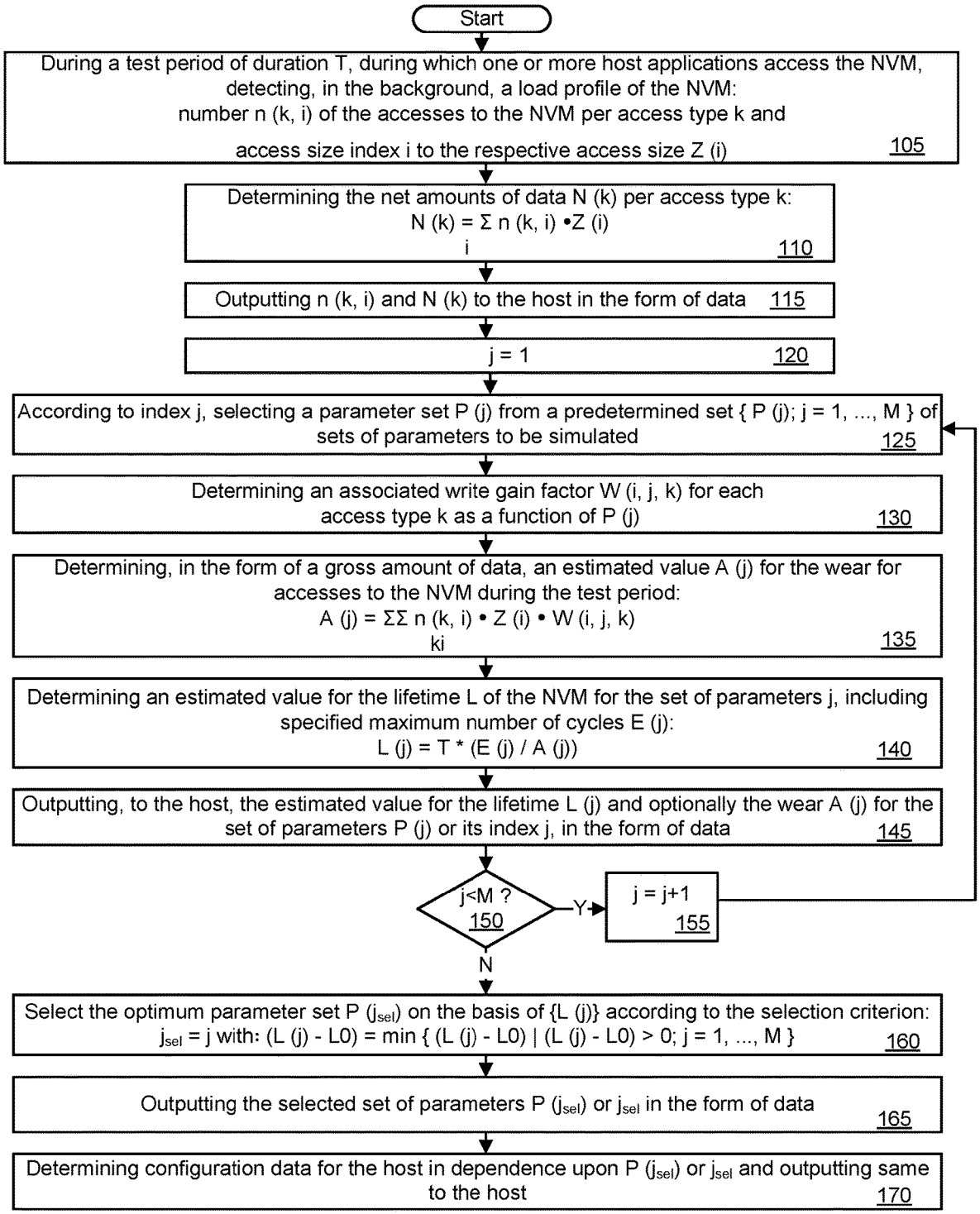
FIG. 3 shows a flowchart in order to illustrate a preferred embodiment of the method in accordance with the present invention.

The method 100 illustrated in FIG. 3 in accordance with an example embodiment of the invention, in which several of the embodiments described herein are used in combination, is explained below with reference, by way of example, to FIGS. 1 and 2. The method can (as already described in connection with FIG. 1) be implemented in particular in the form of a computer program which is stored in the internal memory 2b of the memory controller 2, for example as firmware, in order to run on the processor unit 2a of the memory controller. According to this implementation, the memory system 1 itself is thus already capable of executing the method. The memory system 1 can in particular be constructed as a mobile data carrier, such as a memory card or a memory stick. This makes it possible to execute the method in relation to different host computers with minimal effort, since such a mobile data carrier can be used for different host computers.

The method begins with a step 105, in which, during a test period of duration T, one or more applications running on the host 4 are executed and, during the course of this, access the NVM 3. At the same time, the aforementioned computer program implementing the method runs in the background on the memory controller 2, whereby, per access type k and access size index i to the respective access size Z(i), it detects a load profile n(k,i) for the NVM 3, caused by the applications, with respect to the accesses made by the applications during the test period. FIG. 2, which has already been explained, represents such an example load profile.

In a further, optional step 110, a net amount of data N(k) per access type k is determined by summation, over the index i, of the products of the number n(k,i) of the respective accesses and the associated access size Z(i).

In a further step 115, in particular again an optional step 115, the load profile n(k,i) and/or the net amounts of data N(k) can be output, which can be done, for example, in the form of corresponding data to be transmitted to the host 4. This makes it possible to analyze, per access type, the load profile and the net amounts of data as such. According to a further option, a sum, over k, of the net amounts of data N(k) could also be determined and could be output in a corresponding manner.

Further, an additional index j is initialized in step 120 in order to index a plurality of sets of parameters corresponding to different NVMs or different configurations of the NVM 3. It is also possible for this initialization to take place earlier in the process.

In the subsequent step 125, in accordance with the current value of the index j, the associated set of parameters P(j) is selected from a predetermined set $\{P(j); j=1, \ldots, M\}$ of sets of parameters to be simulated. Each of these sets of parameters preferably comprises a plurality of different parameters which correspond in particular to a used NVM type, the memory size of that NVM type, and specific characteristics of that NVM type, such as for example its page size, its physical memory block size and its specified maximum number of cycles.

Then, in step 130, an associated write amplification factor W(i,j,k) is determined for each access type k as a function of the selected set of parameters P(j). In particular in the case of a block-based management of the NVM 3, the write amplification factors W(i,j,k) can be defined, among other things, or even solely, as explained in the example below, as a function of the memory block size B.

The write amplification factors W(i,j,k) are defined as follows, according to this non-limiting example: The write amplification factors corresponding to the read access types (RS and RR) can either be ignored (W(i,j,RS)=W(i,j,RR)=0 for all values of i and j) or set to a small value determined in dependence upon the expected refresh frequency (for example, W(i, j,RS)=W(i,j, R)=0.01 for all values of i and j). For sequential write accesses (WS), the corresponding write amplification factor can be set to W(i,j,WS)=1 for all values of i and j. If, however, the additional effort for tasks such as the management of the write accesses or wear leveling etc. by the memory controller, in particular its firmware, is to be taken into account as well, a supplement of typically a few percent can be added for these tasks, e.g. of 2%: W(i,j,WS)=1,02 for all values of i and j. For distributed (random) write accesses, the corresponding write amplification factor W(i,j,WR) is additionally revalued with a factor that depends on the ratio of the flash memory block size B to the access size Z(i). Here, too, the management effort can optionally be estimated with a flat-rate factor of, for example, 2%, so that in this case the corresponding write amplification factor for index i becomes: $W(i,j,WR)=1.02 \times \max(1, B/Z(i))$. Here, the corresponding access size Z(i) can in particular be selected as $Z(i)=2^i$.

Now, in step 135, an estimated value A(j) can be determined for the wear of the set of parameters P(j) associated with the current value of the index j in the form of a gross amount of data. For this purpose, the respective products of (a) the absolute number of accesses to the first NVM 3 detected during the test period or the relative number of accesses to the first NVM 3 for the associated type of access in relation to the total number of accesses detected during the test period, (b) the respective associated access size Z(i), and (c) the respective associated write amplification factor W(i,j,k) are summed over the different access types k and the access size index i:

$$A(j)=\Sigma_k \Sigma_i n(k,i) \cdot Z(i) \cdot W(i,j,k) \tag{1}$$

In a further step 140, an estimated value for a lifetime L(j) of the NVM can additionally be determined for the set of parameters P(j). For this purpose, the maximum number of cycles E(j), which is contained as a parameter in the set of parameters P(j), is also used:

$$L(j)=T \cdot (E(j)/A(j)) \tag{2}$$

In step 145, the estimated value for the lifetime L(j) obtained can then be output, optionally together with the set of parameters P(j) or its index j, in particular for the purpose of further manual analysis. In particular, this output can again be sent to the host 4.

Then, in step 150, a check is carried out as to whether there are any further sets of parameters P(j) to be simulated (j<M ?). If this is the case (150—yes), the index j is incremented in step 155 and the method loops back to step 125 for the next run of the method for the new value of j. Otherwise (150—no) an optimal set of parameters $P(j_{sel})$ is automatically selected according to a predetermined selection criterion and on the basis of the previously determined set of estimated values for the lifetime L(j) for all values of j. The selection criterion may in particular be determined in such a way that it determines as the optimum set of parameters $P(j_{sel})$ that set of parameters from the set $\{P(j), j=1, \ldots, M\}$ which provides, among all the sets of parameters, the smallest lifetime L(j) for which L(j) exceeds a predetermined minimum lifetime L0:

$$i_{sel}=j \quad \text{with:} \quad (L(j)-L_0 \min\{(L(j)-L_0)|(L(j)-L_0)>0; \\ j=1, \ldots, M\} \tag{3}$$

In the subsequent step 165, the selected set of parameters $P(j_{sel})$ and/or its corresponding index $j_{sel}$ can then be output in data form, in particular again to the host 4. On this basis, a memory system 1 can be defined on the basis of the selected set of parameters $P(j_{sel})$ which is optimized with regard to the use case used in the test period, i.e. in particular with regard to the one or more applications used for this purpose.

In addition, a further step 170 can be envisaged in which, in dependence upon the selected set of parameters $P(j_{sel})$ optimized configuration data for the host is also defined and output to it. Such configuration data may in particular relate to the access size(s) to be selected by the host for the access the NVM according to the selected set of parameters $P(j_{sel})$, i.e. in particular the size of the data packets sent to the respective memory system 1 configured according to the selected set of parameters $P(j_{sel})$.

While at least one example embodiment has been described above, it should be noted that there are a large number of variations to this. It is also to be noted that the embodiments described by way of example only represent non-limiting examples, and it is not intended to thereby limit the scope, the applicability or the configuration of the devices and methods described here. Rather, the preceding description will provide the skilled person with instructions for the implementation of at least one example embodiment, it being understood that various changes can be made in the functionality and arrangement of the elements described in an example embodiment, without deviating from the subject matter respectively defined in the appended claims, as well as its legal equivalents.

In conclusion, some embodiments discussed herein provide novel systems, devices, and methods for estimating the wear of a non-volatile memory (NVM), in particular a flash memory. While detailed descriptions of one or more embodiments have been given above, various alternatives, modifications, and equivalents will be apparent to those skilled in the art without varying from the spirit of the invention. Therefore, the above description should not be taken as limiting the scope of the invention, which is defined by the appended claims.

LIST OF REFERENCE SIGNS 1 memory system
2 memory controller
2a processor unit
2b embedded memory of the memory controller
3 non-volatile memory, NVM, especially flash memory
4 host or host computer
AL address line(s)
DL data line(s)
CL control line(s)
AB address bus
DB data bus
CB control bus

What is claimed is:

1. A method for estimating a wear of a non-volatile memory (NVM), wherein the method comprises:
   determining a load profile with respect to a real access load occurring during a defined test period, wherein the determined load profile indicates, for a plurality of different access types, a respectively associated access load for accesses to a first NVM, and generating access data representing the determined load profile; and
   determining an estimated value for a wear of a particular second NVM on a basis of the access data and of a set of parameters which characterizes a wear-relevant physical or functional property of the second NVM or of a memory controller associated therewith for controlling the second NVM; wherein the determining the estimated value for the wear comprises: determining the estimated value for the wear of the particular second NVM during the defined test period, which is indicative of a thereby occurring total number of accesses which is determined as a function of the determined load profile and the set of parameters.

2. The method according to claim 1, wherein the first NVM is identical to the second NVM.

3. The method according to claim 1, wherein at least the determination of the load profile is carried out by means of at least one computer program stored on the first NVM itself, or on a memory controller associated with the first NVM for the purpose of controlling the first NVM, which computer program is executed in the background during the execution of one or more host applications using the first NVM, in order to detect accesses of the one or more host applications to the first NVM during their execution.

4. The method according to claim 1, wherein the determination of the respectively associated access load for accesses to the first NVM is expressed as the number of corresponding accesses in relation to a respective integer multiple of a smallest data unit transferable via a host-side interface of a memory system comprising the first NVM.

5. The method according to claim 1, wherein determining the load profile comprises determining an associated access load for accesses to the first NVM relating to at least two of the following access types:
   write load in sequential access (WS),
   write load in random access (WR),
   read load in sequential access (RS),
   read load in random access (RR).

6. The method according to claim 1, wherein the method further comprises:
   outputting the load profile which has been determined for one or more of the access types covered.

7. The method according claim 1, wherein the load profile is determined in such a way that it indicates, for each type of access taken into account, for different value ranges for a respective access size, an associated access load.

8. The method according to claim 7, wherein:
   the second NVM is subject to a block-based management by a memory controller assigned to the second NVM; and
   determining the estimated value for the wear of the particular second NVM comprises determining, for each of the access loads indicated in the load profile as a function of the access size, an associated write amplification factor, and determining the gross amount of data caused by the accesses to the first NVM during the test period on a basis of these write amplification factors.

9. The method according to claim 8, wherein a smaller write amplification factor is assigned to read operations than to write operations.

10. The method according to claim 8, wherein a write amplification factor is assigned to distributed write operations, which write amplification factor depends on a ratio of a physical memory block size of the second NVM to the respective access size.

11. The method according to claim 8, the method further comprising:
   determining the gross amount of data caused by the accesses to the first NVM during the test period;
   by adding respective products of an absolute number of accesses to the first NVM detected during the defined test period or a relative number of accesses to the first NVM for the associated type of access in relation to the total number of accesses detected during the defined test period, the respective associated access size, and the respective associated write amplification factor.

12. The method according to claim 1, the method further comprising:
   determining, per access type, an associated net amount of data by performing a process selected from a group consisting of:
     adding products of an absolute number of respective accesses on the one hand and a respective associated access size on the other hand; and
     adding products of a relative number of respective accesses on the one hand and the respective associated access size on the other hand.

13. The method according to claim 1, wherein the set of parameters characterizes at least one of the following physical or functional properties of the second NVM or of a memory controller assigned to the second NVM for controlling the second NVM, or a combination of two or more of these properties:
   a type of the second NVM,
   a memory size of the second NVM,
   a page size of the memory pages of the second NVM,
   a physical memory block size of the second NVM,
   a specified maximum number of allowable write/erase cycles of the second NVM, and
   a configuration of the memory controller assigned to the second NVM for controlling the second NVM with respect to at least one of the following:
      over-provisioning,
      early acknowledge,
      static data.

14. The method according to claim 1, the method further comprising:
   estimating a lifetime of the second NVM by forming a relation between a time duration of the defined test period and a specific estimated value for the wear of the particular second NVM.

15. The method according to claim 1, wherein the determining the estimated value for the wear of the particular second NVM; and
   the method further comprises at least one of the following steps:
   outputting respective estimates determined for the plurality of different sets of parameters;
   automatically selecting one of the sets of parameters from the plurality of sets of parameters on the basis of the determined estimates and in accordance with a predetermined selection criterion related to the estimated value with respect to which the selected set of parameters represents a relative optimum, and at least outputting a portion of that set of parameters or an identification thereof.

16. The method according to claim 15, further comprising:
   transmitting configuration data to a host computer representing a request to the host computer to use, for future accesses to the second NVM, an access configuration which is defined by the configuration data and which is selected in dependence on the selected set of parameters.

17. A non-transitory computer readable medium, the non-transitory computer readable medium including instructions executable by a memory control system to:
   determine a load profile with respect to a real access load occurring during a defined test period, wherein the load profile indicates, for a plurality of different access types, a respectively associated access load for accesses to a first NVM, and generating access data representing the determined load profile; and
   determine an estimated value for the wear of a particular second NVM on a basis of the access data and of a set of parameters which characterizes a wear-relevant physical or functional property of the second NVM or of a memory controller associated therewith for controlling the second NVM; wherein the determining the estimated value for the wear of the particular second NVM comprises: determining a gross amount of data caused by the accesses to the first NVM during the test period, which is indicative of a thereby occurring total number of accesses which is determined as a function of the determined load profile and the set of parameters.

18. An apparatus for estimating a wear of a NVM, wherein the apparatus is operable to:
   determine, by a processor, a load profile with respect to a real access load occurring during a defined test period, wherein the load profile indicates, for a plurality of different access types, a respectively associated access load for accesses to a first NVM, and generating access data representing the determined load profile; and
   determine, by the processor, an estimated value for a wear of a particular second NVM on the basis of the access data and of a set of parameters which characterizes a wear-relevant physical or functional property of the particular second NVM or of a memory controller associated therewith for controlling the particular second NVM; wherein the determining the estimated value for the wear comprises: determining a gross amount of data caused by the accesses to the first NVM during the defined test period, which is indicative of a thereby occurring total number of accesses which is determined as a function of the determined load profile and the set of parameters.

19. The apparatus of claim 18, wherein the first NVM is identical to the particular second NVM.

20. The apparatus of claim 18, wherein the apparatus comprises a memory control device assigned to the NVM for the purpose of controlling the NVM.

* * * * *